United States Patent
Pulini et al.

(10) Patent No.: US 9,661,079 B2
(45) Date of Patent: May 23, 2017

(54) APPARATUS AND METHOD FOR PROVIDING A COMMON INTERFACE FOR MULTIPLE WIRELESS COMMUNICATION PROTOCOLS

(71) Applicant: Honeywell International Inc., Morristown, NJ (US)

(72) Inventors: Christopher Pulini, Ambler, PA (US); Alexander Chernoguzov, Warrington, PA (US); Prasad Samudrala, Bangalore (IN); Norman R. Swanson, Douglassville, PA (US); William Osei-Bonsu, Collegeville, PA (US)

(73) Assignee: Honeywell International Inc., Morris Plains, NJ (US)

( * ) Notice: Subject to any disclaimer, the term of this patent is extended or adjusted under 35 U.S.C. 154(b) by 0 days.

(21) Appl. No.: 13/908,977

(22) Filed: Jun. 3, 2013

(65) Prior Publication Data
US 2014/0355581 A1    Dec. 4, 2014

(51) Int. Cl.
*H04W 80/00* (2009.01)
*H04L 29/08* (2006.01)
*H04L 12/64* (2006.01)

(52) U.S. Cl.
CPC .......... *H04L 67/12* (2013.01); *H04L 12/6418* (2013.01); *H04W 80/00* (2013.01)

(58) Field of Classification Search
CPC ..... H04L 12/6418; H04L 67/12; H04W 80/00
See application file for complete search history.

(56) References Cited

U.S. PATENT DOCUMENTS

| | | | |
|---|---|---|---|
| 7,327,717 B2 | 2/2008 | Borowski et al. | |
| 7,965,664 B2 | 6/2011 | Hodson et al. | |
| 7,969,300 B2 | 6/2011 | Coronel et al. | |
| 8,239,046 B2 | 8/2012 | Koehler et al. | |
| 8,583,067 B2 | 11/2013 | Budampati et al. | |
| 9,021,255 B1 * | 4/2015 | Aharoni .................. | H04L 29/06 713/155 |
| 9,379,972 B2 | 6/2016 | Enns et al. | |

(Continued)

OTHER PUBLICATIONS

International Search Report dated Oct. 10, 2014 in connection with International Patent Application No. PCT/US2014/038208; 3 pages.

(Continued)

*Primary Examiner* — David Oveissi

(57) ABSTRACT

A method includes receiving data from multiple wireless field devices using multiple wireless communication protocols. The method also includes normalizing the data from the wireless field devices using one or more templates associated with the wireless field devices. The method further includes transmitting the normalized data in a unified format. The method could also include generating the one or more templates using device description (DD) files associated with the wireless field devices. Each template may provide, for one wireless field device or type of wireless field device, (i) an indication of a type of data provided by the wireless field device or type of wireless field device, (ii) a range of data provided by the wireless field device or type of wireless field device, and (iii) how to normalize data from the wireless field device or type of wireless field device into the unified format.

20 Claims, 4 Drawing Sheets

(56) References Cited

U.S. PATENT DOCUMENTS

| | | |
|---|---|---|
| 2004/0259533 A1 | 12/2004 | Nixon et al. |
| 2005/0174964 A1 | 8/2005 | Orlik et al. |
| 2008/0080395 A1 | 4/2008 | Law et al. |
| 2009/0224906 A1 | 9/2009 | Balgard et al. |
| 2009/0316628 A1 | 12/2009 | Enns et al. |
| 2011/0110291 A1 | 5/2011 | Ishii |
| 2011/0245932 A1* | 10/2011 | Schleiss et al. ................. 700/7 |
| 2011/0276607 A1* | 11/2011 | Surna ................. G06F 9/30192 707/812 |
| 2012/0063330 A1 | 3/2012 | Mori et al. |
| 2012/0084400 A1 | 4/2012 | Almadi et al. |
| 2012/0230446 A1 | 9/2012 | Feng |
| 2012/0236768 A1 | 9/2012 | Kolavennau et al. |
| 2013/0110998 A1 | 5/2013 | Zrelli et al. |
| 2014/0119220 A1 | 5/2014 | Wang |
| 2014/0232555 A1 | 8/2014 | Aakvaag et al. |
| 2015/0058480 A1 | 2/2015 | Allgaier et al. |
| 2015/0304193 A1 | 10/2015 | Ishii et al. |

OTHER PUBLICATIONS

Written Opinion of International Searching Authority dated Oct. 10, 2014 in connection with International Patent Application No. PCT/US2014/038208; 5 pages.

U.S. Appl. No. 13/871,897 entitled "Slot Segregation for Supporting Multiple Communication Protocols in an Industrial Wireless Network"; filed Apr. 26, 2013; 33 pages.

European Search Report in connection with EP Application No. 14164273.6-1857; Sep. 22, 2014; 3 pages.

Office Action dated Jul. 14, 2016 in connection with U.S. Appl. No. 14/035,557, 14 pages.

The International Searching Authority, "Supplementary European Search Report and Annex to the European Search Report," Application No. 14807495.8-1853, Nov. 10, 2016, 10 pages, publisher European Patent Office, Munich, Germany, place of search: The Hague.

* cited by examiner

APPARATUS AND METHOD FOR PROVIDING A COMMON INTERFACE FOR MULTIPLE WIRELESS COMMUNICATION PROTOCOLS

TECHNICAL FIELD

This disclosure relates generally to industrial control systems. More specifically, this disclosure relates to an apparatus and method for providing a common interface for multiple wireless communication protocols.

BACKGROUND

Wireless networks are frequently used in industrial process control systems. For example, sensors could provide measurements over a wireless network, and actuators could receive control signals over the wireless network. The wireless network may include interconnected network devices such as field device access points (FDAPs), wireless field devices (also known as wireless field instruments), and wireless device managers (WDMs).

A wireless network in an industrial facility often supports wireless devices that operate in accordance with a single wireless communication protocol. A conventional wireless network typically requires extensive hardware modifications in order to support wireless devices compatible with alternative communication protocols. Thus, additions or replacements of wireless devices in a particular industrial facility are typically allowed only if the new devices are compatible with an existing wireless communication protocol used in the industrial facility.

SUMMARY

This disclosure provides an apparatus and method for providing a common interface for multiple wireless communication protocols.

In a first embodiment, a method includes receiving data from multiple wireless field devices using multiple wireless communication protocols. The method also includes normalizing the data from the wireless field devices using one or more templates associated with the wireless field devices. The method further includes transmitting the normalized data in a unified format.

In a second embodiment, an apparatus includes at least one interface configured to receive data from multiple wireless field devices using multiple wireless communication protocols. The apparatus also includes at least one processing device configured to normalize the data from the wireless field devices using one or more templates associated with the wireless field devices and to transmit the normalized data in a unified format.

In a third embodiment, a non-transitory computer readable medium embodies a computer program. The computer program includes computer readable program code for receiving data from multiple wireless field devices using multiple wireless communication protocols. The computer program also includes computer readable program code for normalizing the data from the wireless field devices using one or more templates associated with the wireless field devices. The computer program further includes computer readable program code for initiating transmission of the normalized data in a unified format.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

This disclosure generally provides methods and systems to support multiple wireless communication protocols or standards. The methods and systems may be implemented, for example, in a wireless network capable of supporting multiple devices operating in accordance with different protocols or standards. In the following description, a wireless network in an industrial facility is described as simultaneously supporting wireless field devices that operate in accordance with ISA100 Wireless (also referred to as ISA100.11a) protocols and wireless field devices that operate in accordance with Wireless Highway Addressable Remote Transducer (WirelessHART, also referred to as WHART) protocols. These two protocols are provided for illustration only, and other or additional protocols could be supported in an industrial wireless network. In general, field devices may include transmitters, receivers, sensors, actuators, and WiFi, Ethernet, and Internet Protocol (IP) based devices.

Figure 1:
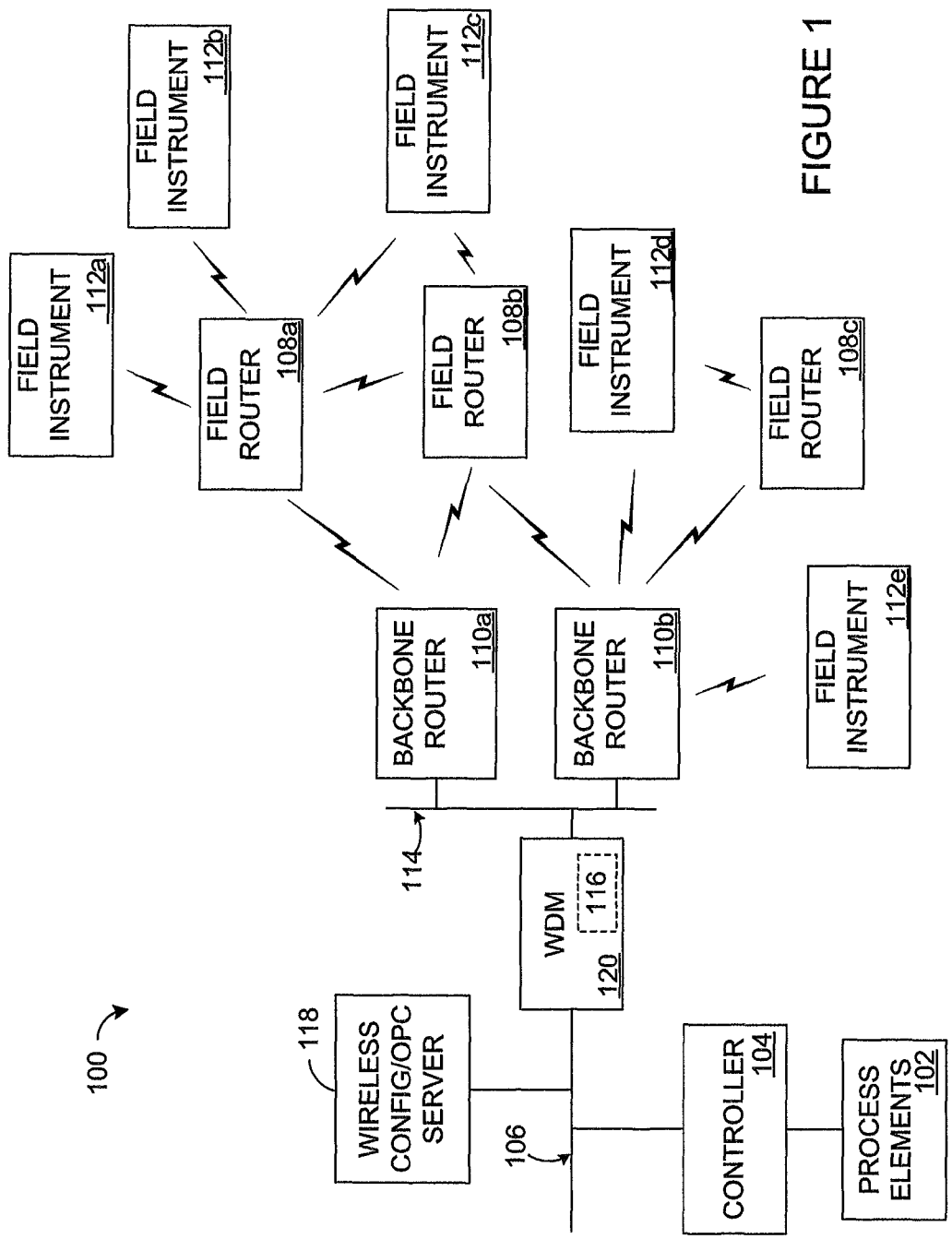
FIG. 1 illustrates an example industrial control and automation system having a common interface for multiple wireless communication protocols according to this disclosure.

FIG. 1 illustrates an example industrial control and automation system 100 having a common interface for multiple wireless communication protocols according to this disclosure. As shown in FIG. 1, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system represents any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to generate control signals for others of the process elements 102 such as actuators, thereby adjusting the operation of those process elements 102. The controller 104 includes any suitable structure for controlling one or more process elements 102. The controller 104 could, for example, represent a computing device executing a MICROSOFT WINDOWS or suitable real-time operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks, all or a portion of a global network, or any other communication system(s) at one or more locations. As a particular example, the network 106 could include a FAULT TOLERANT ETHERNET network from HONEYWELL INTERNATIONAL INC.

The system 100 also includes one or more industrial wireless networks for communicating with wireless sensors or other wireless field devices. In the example shown in FIG. 1, an industrial wireless network includes field routers 108a-108c and backbone routers 110a-110b. The field routers 108a-108c and backbone routers 110a-110b wirelessly communicate with each other to form a wireless network, such as a mesh network. For example, the field routers 108a-108c could receive data transmitted wirelessly from field instruments 112a-112e and route the data to the backbone routers 110a-110b. The backbone routers 110a-110b could receive data from the field routers 108a-108c directly or indirectly (such as through other field routers) and directly or indirectly from the field instruments 112a-112e for transmission over a backbone network 114. The field routers 108a-108c and backbone routers 110a-110b could also route data received over the backbone network 114 to the field instruments 112a-112e. In this way, the field routers 108a-108c and backbone routers 110a-110b form a network that can provide wireless coverage to field instruments and other devices in a specified area, such as a large industrial complex. The wireless network can support any suitable industrial wireless network protocol(s), such as ISA100 Wireless and WirelessHART.

In this example, the field routers 108a-108c and backbone routers 110a-110b generally represent routing devices that store and forward messages for other devices. Field routers 108a-108c may be locally or battery powered. Backbone routers 110a-110b may be line-powered, meaning these devices receive operating power from external sources (such as AC supply lines). However, a field or backbone router could represent a device powered by a local power supply, such as an internal battery (referred to as locally-powered). The field instruments 112a-112e generally represent non-routing devices that are routinely locally-powered, although a field instrument could provide routing functionality or be line-powered.

Each field router 108a-108c and backbone router 110a-110b includes any suitable structure facilitating wireless communications, such as a radio frequency (RF) frequency-hopping spread spectrum (FHSS) or direct sequence spread spectrum (DSSS) transceiver. Each of the backbone routers 110a-110b also includes any suitable structure facilitating communication over the backbone network 114, such as an Ethernet transceiver. In particular embodiments, the field routers 108a-108c could represent field device access points (FDAPs) that are not connected via wired Ethernet and may be locally powered, and the backbone routers 110a-110b could represent FDAPs that are connected via wired Ethernet and may be line powered. The backbone network 114 includes any suitable network for transporting data, such as a FAULT TOLERANT ETHERNET network, a wireless mesh network, or other wired or wireless network.

A gateway 116 couples the network 106 and the backbone network 114. The gateway 116 can perform security functions to allow only authorized traffic to flow between the networks 106 and 114. The gateway 116 can also perform translation functions to translate between protocols. The gateway 116 includes any suitable structure for providing access to networks and translating between protocols used by those networks.

A wireless configuration and OLE for Process Control (OPC) server 118 can configure and control various aspects of the system 100 via a wireless device manager (WDM) 120. For example, the server 118 allows for the control of process elements 102 via controller 104 and via WDM 120, which configures the operation of the field routers 108a-108c, backbone routers 110a-110b, and field instruments 112a-112e. The server 118 could also support security in the system 100, such as by allowing the WDM 120 to distribute cryptographic keys or other security data to various wireless devices or other components. The server 118 includes any suitable structure for operating industrial control and automation system 100.

In particular embodiments, various devices in the wireless network of FIG. 1 form a mesh network communicating at 2.4 GHz or 5.8 GHz. Also, in particular embodiments, data can be injected into the wireless mesh network through the routers or field instruments, thus providing versatile, multi-functional, plant-wide coverage for wireless sensing, asset location tracking, personnel tracking, wireless communications, and any other or additional functionality as desired.

In one aspect of operation, one or more components in the system 100 support the use of multiple wireless communication protocols in the wireless network, such as protocols compliant with the ISA100 Wireless and WirelessHART standards. To support this functionality, the system 100 may include the WDM 120, which comprises a gateway 116. The wireless device manager 120 could be used in other or additional component(s) of the system 100 or as a stand-alone device. The wireless device manager 120 supports the caching of data received using different wireless protocols via the gateway 116. The cached data can then be provided to an external client, such as a user device, in a unified format, regardless of the protocol or protocols in which the cached data was received.

The wireless device manager 120 includes any suitable structure(s) for receiving communications associated with different protocols and storing data. The wireless device manager 120 could, for example, represent hardware components only or hardware components along with software/firmware instructions that are executed.

Although FIG. 1 illustrates one example of an industrial control and automation system 100 having a common interface for multiple wireless communication protocols, various changes may be made to FIG. 1. For example, the system 100 could include any number of each component. Also, the functional division shown in FIG. 1 is for illustration only. Various components in FIGURE could be combined, subdivided, or omitted and additional components could be added according to particular needs. Further, while the wireless network is illustrated as being used along with a wired controller 104 and wired process elements 102, one or more wireless networks could be used in a system without wired control elements. In addition, FIG. 1 illustrates one example operational environment where the use of multiple protocols can be supported. This functionality could be used in any other suitable system.

Figure 2:
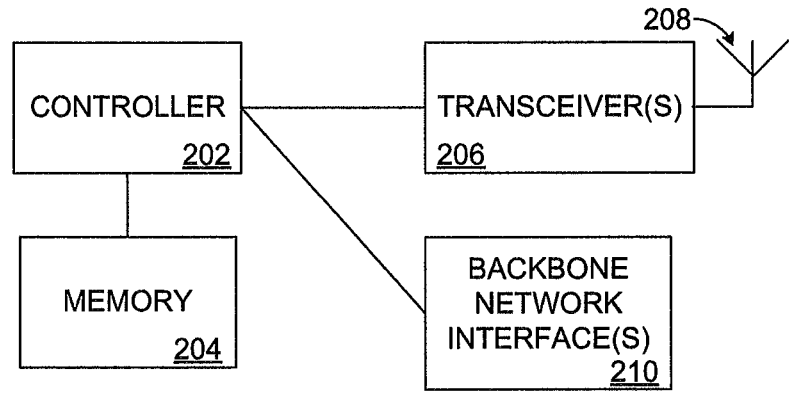
FIG. 2 illustrates an example wireless device in an industrial control and automation system according to this disclosure.

FIG. 2 illustrates an example wireless device 200 in an industrial control and automation system according to this disclosure. The wireless device 200 could, for example, represent a field router 108a-108c, a backbone router 110a-110b, or a gateway 116 in the system 100 of FIG. 1.

As shown in FIG. 2, the device 200 includes a controller 202, which controls the overall operation of the device 200. For example, the controller 202 may receive or generate data to be transmitted, and the controller 202 could provide the data to other component(s) in the device 200 for transmission over a wired or wireless network. The controller 202 could also receive data over a wired or wireless network and use or forward the data. As a particular example, the controller 202 in a field router or backbone router could receive data transmitted wirelessly, determine a next hop for the data (if any), and provide the data for transmission to the next hop (if any). As another example, the controller 202 in a backbone router could receive data from a wired network and provide the data for transmission in a wireless network (or vice versa). As yet another example, the controller 202 in a gateway could perform operations to convert data from one format to another. The controller 202 includes any suitable structure for controlling operation of a device. As particular examples, the controller 202 could represent a processor, microprocessor, microcontroller, field programmable gate array, digital signal processor, or other processing or control device.

A memory 204 is coupled to the controller 202. The memory 204 stores any of a wide variety of information used, collected, or generated by the device 200. For example, the memory 204 could store information received over a network that is to be transmitted over the same or other network. The memory 204 includes any suitable volatile and/or non-volatile storage and retrieval device(s).

The device 200 can include additional components depending on the type and operation of the device 200. For example, in a field router or backbone router, the device 200 could include at least one wireless transceiver 206 and at least one antenna 208. The transceiver(s) 206 and antenna(s) 208 can be used to communicate wirelessly with one or more field instruments or with other field routers or backbone routers. A transceiver 206 could have its own antenna(s) 208, or a collection of transceivers 206 could share one or more antennas 208. Each transceiver 206 includes any suitable structure for providing signals for wireless transmission and/or for obtaining signals received wirelessly. Each antenna 208 represents any suitable structure for transmitting and/or receiving wireless signals. In some embodiments, each transceiver 206 represents an RF transceiver, such as an RF FHSS or DSSS transceiver. Also, each antenna 208 could represent an RF antenna. Note that any other suitable wireless signals could be used to communicate and that each transceiver could include a transmitter and a separate receiver. If multiple antennas 208 are used, spatial diversity or other types of diversity can be used to improve communication reliability.

If the device 200 represents a backbone router or a gateway, the device 200 can further include one or more backbone network interfaces 210. The backbone network interfaces 210 allow the device 200 to communicate over one or more backbone networks 114 or other networks. Each backbone network interface 210 includes any suitable structure for transmitting and/or receiving signals over a backbone network, such as an Ethernet interface or a wireless transceiver.

As described in more detail below, the controller 202 and the memory 204 can be used to support multiple communication protocols in an industrial wireless network. For example, the controller 202 and the memory 204 could support the use of a wireless device manager 120 in the wireless device 200. The controller 202 could cache data received using multiple protocols in the memory 204, and the controller 202 could provide the cached data to one or more external clients in a unified format.

Although FIG. 2 illustrates one example of a wireless device 200 in an industrial control and automation system, various changes may be made to FIG. 2. For example, various components in FIG. 2 could be combined, subdivided, or omitted and additional components could be added according to particular needs. Also, a "wireless device" or "wireless router" represents any device or router that can transmit and/or receive data wirelessly, even if the device or router has the ability to transmit and/or receive data over a wired connection as well.

Figure 3:
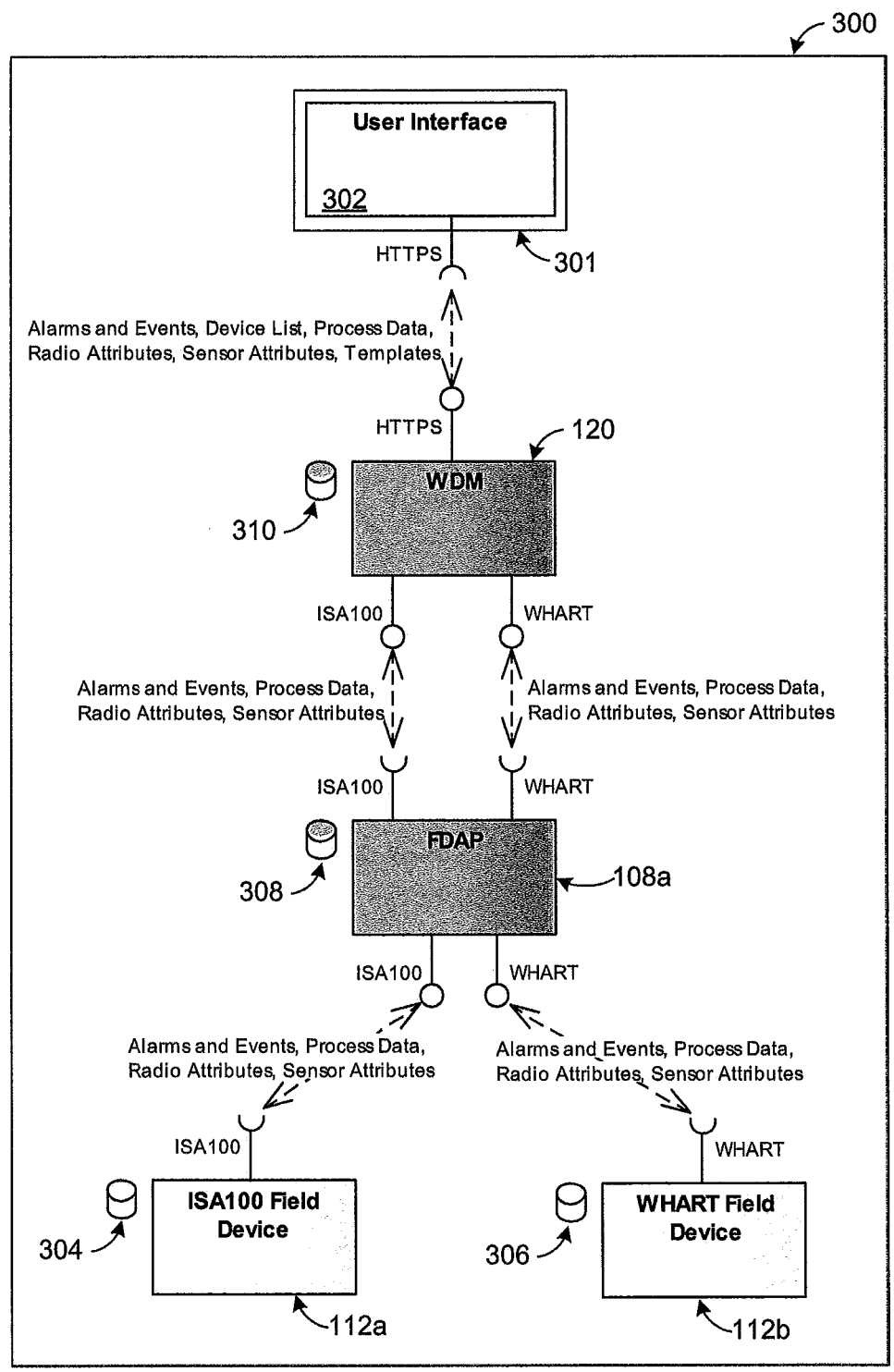
FIG. 3 illustrates an example process flow within an industrial control and automation system according to this disclosure.

FIG. 3 illustrates an example process flow 300 within an industrial control and automation system 100 according to this disclosure. As shown in FIG. 3, the process flow 300 involves two field instruments 112a-112b, which here use different protocols. The process flow 300 also involves the field router 108a and the wireless device manager 120, which is assumed here to reside within a backbone router or gateway. The process flow 300 further involves a user device 301 having a user interface 302. The user device 301 could represent any suitable user device, such as an operator's desktop computer, laptop computer, dummy terminal, mobile smartphone, or other portable or fixed device. In particular embodiments, the user device 301 represents a computing device capable of executing a web browser.

The field instruments 112a-112b, field router 108a, and wireless device manager 120 here include or are associated with storage devices 304-310, respectively. The storage devices 304-310 can store information used, generated, or collected by their associated devices 112a, 112b, 108a, 120, respectively. The storage devices 304-310 can represent any suitable storage and retrieval device(s), such as nonvolatile memory devices like a hard disk or flash memory and volatile memory devices like random access memory. Non-volatile memory devices may be used to restart and reload a device after a power cycle or other reboot. Each of the storage devices 304-310 here could represent the memory 204 or a separate device.

As shown in FIG. 3, various components of the system 100 send and receive messages to communicate alarms and events, process data, radio attributes, and sensor attributes. Alarms and events can be generated by the field instruments 112a-112b, such as to indicate that various conditions have met or exceeded certain thresholds. Radio attributes typically represent configurations and settings related to wireless communications in the system 100. Radio attributes can be used by the wireless device manager 120 to support and control wireless communications using limited bandwidths and frequencies.

Sensor attributes typically represent configurations and settings related to sensors that may be controlled, such as via the user interface 302. For example, if a wireless field instrument is a temperature sensor, sensor attributes could include a cold junction temperature and an indication of whether the device is in-service or out-of-service. Sensor attributes may generally represent parameters that are specific to the type or function of a device and are not related to network management.

Process data can be generated by the field instruments 112a-112b to indicate conditions measured by the instruments. For example, process data can include measured values from sensors, such as temperature, pressure, flow rate, voltage, or current readings. Process data is typically distributed via data publication, although other distribution techniques could also be used.

The user device 301 and the wireless device manager 120 can also exchange templates and device lists. The device lists can identify various devices, such as the field instruments, that communicate with the wireless device manager 120. The templates describe the wireless field instruments. For example, the templates can provide for each field instrument or type of field instrument:

an indication of the type of data provided by the field instrument or type of field instrument;

the range of data provided by the field instrument or type of field instrument; and how to normalize data from the field instrument or type of field instrument into a unified format.

The user device 301 supports the user interface 302 for interacting with the wireless device manager 120. In this example, the user interface 302 uses hypertext transfer protocol secure (HTTPS) technology to connect with the wireless device manager 120, although other types of interfaces could also be used. The use of HTTPS allows the use of a web browser in a secure manner as part of the user interface 302, which can be directed to the IP address of the wireless device manager 120. When the web browser is opened and pointed to the wireless device manager 120, a user interface application can be copied from the wireless device manager 120 to the user device 301, and the user interface application can communicate with a user interface agent on the wireless device manager 120.

In some embodiments, the user interface 302 may present an operator with a list of wireless field instruments within all or part of the industrial control and automation system 100. This list can be defined by the device list. The user interface 302 may also allow the operator to configure and read or write different attributes to and from the field instruments. For example, the user interface 302 may display information showing that a wireless field instrument is measuring a certain temperature. The user interface 302 may also display information showing that another wireless field instrument has generated an alarm and provided a bit stream indicating one or more diagnostics are running on the field instrument.

The user interface 302 also provides a unified format for viewing data associated with field instruments that utilize different communication protocols. In other words, the same interface 302 can be used to view information associated with and configure field devices that use different protocols, such as the ISA100 Wireless and WirelessHART protocols. Moreover, the data presented in the interface 302 can have the same general format even if the data is received from the field devices in different formats.

The wireless device manager 120 manages the wireless network, which in this example includes the field router 108a and the field instruments 112a-112b. The wireless device manager 120 here includes an HTTPS interface to connect with the user interface 302 and wireless interfaces (ISA100 Wireless and WirelessHART in this example) to communicate with the field router 108a. The field router 108a here includes wireless interfaces (ISA100 Wireless and WirelessHART in this example) to communicate with the wireless device manager 120 and with the field instruments 112a-112b. Note that the use of separate ISA100 Wireless and WirelessHART (or other protocol) interfaces is not required, and other approaches could also be used. For instance, a single transceiver could be used with a time division multiple access (TDMA) scheme to communicate with ISA100 Wireless and WirelessHART devices or devices using other protocols. Details of this approach are provided in U.S. patent application Ser. No. 13/871,897, which is hereby incorporated by reference in its entirety.

The wireless device manager 120 interacts with the user device 301 by sending and receiving messages via the HTTPS interfaces. These communications can occur directly or indirectly through other devices like data wired/wireless routers and switches. The wireless device manager 120 also interacts with the field instruments 112a-112b via the field router 108a. The field router 108a can include different protocol stacks, such as ISA100 Wireless and WirelessHART protocol stacks, to support communications between the wireless device manager 120 and the field instruments 112a-112b using different protocols. The wireless device manager 120 can also include different protocol stacks, such as ISA100 Wireless and WirelessHART protocol stacks, to support communications with the field instruments 112a-112b using different protocols. Depending on the implementation, the wireless device manager 120 and field router 108a could communicate using different protocols simultaneously or at different times.

The wireless device manager 120 generally operates by receiving messages from the field devices 112a-112b via the backbone routers 110a-110b. The messages can be received using different protocols, and data in the messages can have different formats or other characteristics (such as bit length and resolution). The wireless device manager 120 can extract the data from the messages and store the data in the associated storage device 310. The wireless device manager 120 can then make that data available to the user interface 302 in a unified format. The wireless device manager 120 can also make various functions available to a user, and the available functions can be based on the field device being viewed or configured by an operator. As an example of this, ISA100 Wireless may allow users to upgrade a field device's firmware while WirelessHART may not, so a "Firmware Upgrade" option can be disabled in the user interface 302 if a WirelessHART device is selected.

Although FIG. 3 illustrates one example of a process flow 300 within an industrial control and automation system 100, various changes may be made to FIG. 3. For example, a wireless device manager 120 could receive data from any number of field instruments via any number of field routers.

Figure 4:
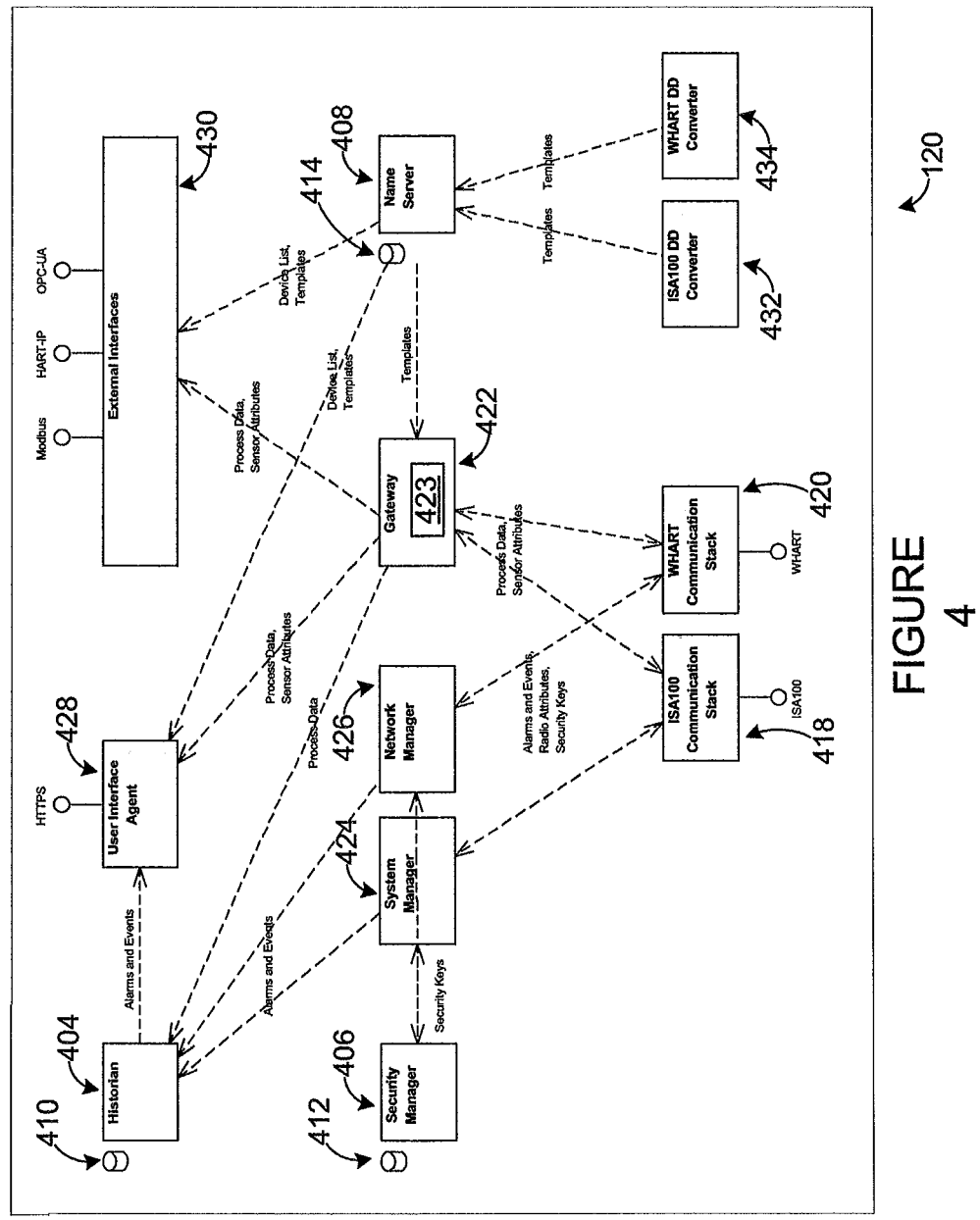
FIG. 4 illustrates an example wireless device manager of an industrial control and automation system according to this disclosure.

FIG. 4 illustrates an example wireless device manager 120 of an industrial control and automation system according to this disclosure. The wireless device manager 120 includes various components, each of which could be implemented using hardware and/or software or firmware instructions (which can be executed by a hardware platform). Note that while these components are shown as forming a centralized wireless device manager 120, the components in FIG. 4 could be divided and executed on multiple platforms in a distributed manner.

A historian 404 can be used to log various process data, alarms, and events received at the wireless device manager 120. This data can then be used for various purposes, such as reporting. A security manager 406 can be used to provide security keys or other wireless network credentials. In some embodiments, the security manager 406 can act as a centralized security repository for all wireless devices, regardless of which protocols are used by the wireless devices. This can help to avoid the need to maintain separate sets of security keys for devices that use different protocols. A name server 408 can be used to identify field instruments that are in use and available for interaction with the wireless device manager 120. The name server 408 can provide device lists identifying those field instruments and templates identifying how to process data from those field instruments. The historian 404, security manager 406, and name server 408, can include various storage devices 410-414, respectively. These storage devices 410-414 can be used to store information used by those components.

The wireless data manager 120 also includes multiple protocol stacks 418-420, each associated with a different communication protocol. In this example, the protocol stacks include an ISA100 Wireless protocol stack 418 and a WirelessHART protocol stack 420. The protocol stacks 418-420 are used to exchange process data and sensor attributes with a gateway 422, which can provide that data to the historian 404 and other components.

The protocol stacks 418-420 also exchange alarms, events, radio attributes, and security keys with at least two managers 424-426, which are associated with different communication protocols. The manager 424 can represent a system manager used to manage an ISA100 network, and the manager 426 can represent a network manager used to manage a WirelessHART network. The manager 424 can communicate via the protocol stack 418, while the manager 426 can communicate via the protocol stack 420. The managers 424-426 can perform various functions to support the management of ISA100 Wireless and WirelessHART networks, such as allowing nodes to join the networks and security validation. The managers 424-426 can also manage the radio attributes of devices connected to the networks.

A user interface agent 428 interacts with external devices supporting user interfaces, such as the user interface 302. In this example, the user interface agent 428 can be accessed using HTTPS, although other access mechanisms could be used. The user interface agent 428 receives alarms, events, process data, sensor attributes, and device lists from various sources and provides this data to the user interface 302. The user interface agent 428 can provide this data using templates to ensure a unified display is presented to a user regardless of protocol.

Various external interfaces 430 can also provide process data, sensor attributes, device lists, templates, and other data to external clients and systems, such as a distributed control system (DCS). Any suitable protocol(s) can be supported by the external interfaces 430. In this example, the protocols include MODBUS, HART-IP, and OPC-UA protocols.

Two converters 432-434 are used to convert device description (DD) files into suitable templates for use in storing data in a unified format. The converters 432-434 generally accept DD files for different field devices. DD files are often provided by device manufacturers and describe the various capabilities of the field devices. The converters 432-434 can use this information to map various data fields associated with the devices to data fields of a unified display. The converters 432-434 can also use this information to determine the formats of the various data fields associated with the devices and to determine how to convert those formats into a unified format. Although shown here as separate converters, a single converter could be used to convert different protocols into templates.

In one aspect of operation, the name server 408 can provide templates to the gateway 422, which allow the gateway 422 to identify the native formats of data sent by wireless devices and how to interpret or normalize that data into a unified format. The gateway 422 can then receive and cache (store) data from the wireless devices, such as process data and sensor attributes. For instance, the gateway 422 can cache this data as that data is published by the wireless devices. The gateway 422 can also make that data available in the unified format regardless of protocol.

The unified format resolves differences between data formats of the different communication protocols. When stored in the unified format, the data may also be normalized so that process data from wireless devices having different specifications have similar types, bit widths, and ranges. For example, an ISA100 Wireless field device may give an 8-bit status and a 32-bit floating point temperature reading, while a similar WirelessHART wireless field device might give a 12-bit status and a 24-bit unsigned integer temperature for a similar temperature. Using the templates, the gateway 422 can understand both native formats and translate or normalize the data into a unified format to have a common representation of data from both types of wireless field devices. Via the gateway 422, a user can use a web browser to view information from one, some, or all of the field devices in a network.

Data from one or more wireless devices may be transferred to external clients or systems via a request-response technique. Using this technique, an external client (via the user interface agent 428 or external interface 430) sends a request for data to the wireless device manager 120. The request is received by the gateway 422, and the gateway 422 determines if the requested data is already stored in a cache 423. If so, the gateway 422 sends the data to the external client. If not, the gateway 422 can send a request to the appropriate wireless device(s) and obtain the data from the wireless device(s). The gateway 422 converts the response data into the unified format, normalizes the response data, and puts the response data into its cache 423. The gateway 422 then returns the response data to the client using the unified format.

If multiple external clients request the same data from a wireless field device, the gateway 422 can receive the multiple requests and send a single request to the wireless field device. The gateway 422 can then send response data in the unified format to the multiple requesting external clients. In this way, the gateway 422 can reduce power consumption of the wireless devices by throttling messages between external clients and the wireless devices.

Process data from a wireless field device is often published via a publishing technique. That is, the wireless device publishes process data at a specified interval, and other components called subscribers can receive publications from the wireless device. Published process data from a wireless field device can come directly to the gateway 422, and the gateway 422 can update the published process data as more publications from the wireless device are received. The gateway 422 also monitors the receipt of publications to ensure that publications are continuously received. If the gateway 422 determines that publications have stopped or become stale, the gateway 422 can mark the data related to the publications in the cache 423 as invalid and no longer sends such data to external clients, and data marked as invalid can be removed from the cache 423. This prevents external clients from receiving stale data and allows the external clients to take appropriate actions based on the data being marked invalid or not being sent.

A publication period indicates how often publications are sent from wireless field devices. A stale limit can indicate how many publication periods can be missed before the data is treated as stale and marked as invalid in the cache 423 of the gateway 422. The publication period and stale limit may be configured via external clients and can be maintained for individual wireless devices or groups of wireless devices.

Templates can also be used by the user interface agent 428 and the external interfaces 430. For example, the templates can be used by the user interface agent 428 to define how alarms are presented in a unified format. The templates can be used by the user interface agent 428 and the external interfaces 430 to ensure that process data and sensor attributes are displayed correctly in the unified format.

By providing the templates to the various components of the wireless device manager 120, the various data collected from the wireless field devices can be provided to users and external clients in a unified format. Also, configurations and other settings for the wireless field devices can be collected from users and external clients in a unified format. This can be accomplished regardless of the protocol or protocols used to communicate with the wireless field devices.

Although FIG. 4 illustrates one example of a wireless device manager 120 of an industrial control and automation system, various changes may be made to FIG. 4. For example, various components in FIG. 4 could be omitted, combined, or further subdivided and additional components could be used according to particular needs.

Figure 5:
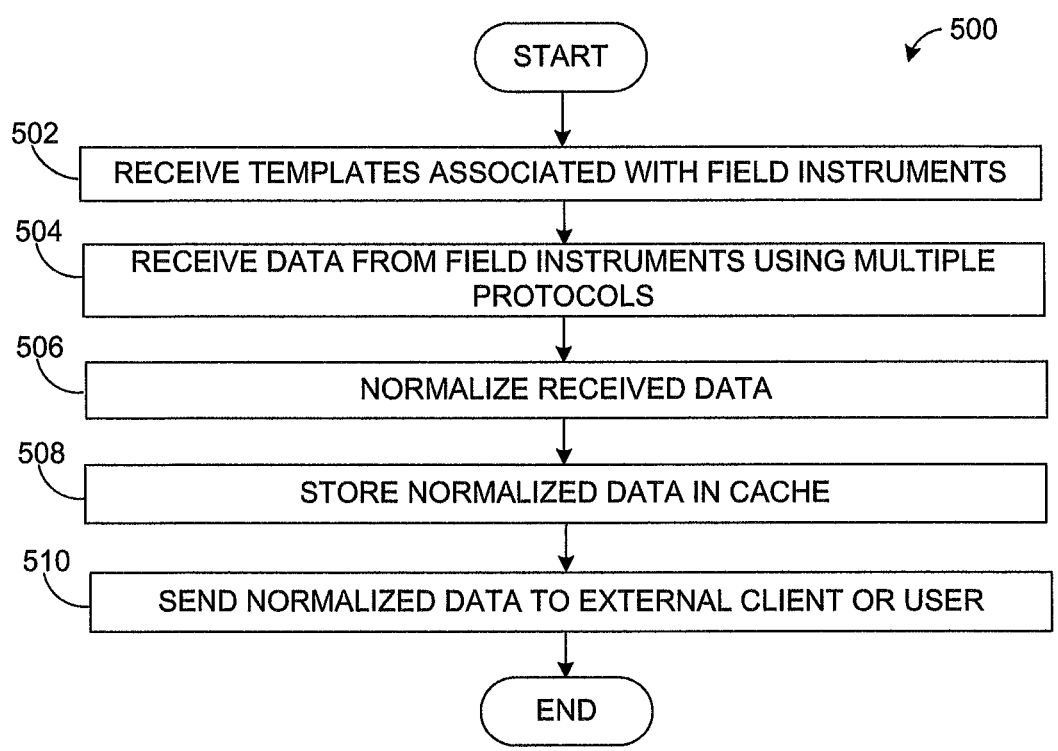
FIG. 5 illustrates an example method for using a common interface to support multiple wireless communication protocols according to this disclosure.

FIG. 5 illustrates an example method 500 for using a common interface to support multiple wireless communication protocols according to this disclosure. The method 500 could, for example, be performed by a wireless device manager 120 in the system 100 of FIG. 1.

Templates associated with field instruments are received at step 502. The templates can describe wireless field devices and how to normalize data sent to or received from the wireless field devices. This step could include receiving the templates from an external source or generating the templates, such as using DD files describing the types and ranges of data and messages sent to and received from wireless field devices. The templates could be received by the gateway 422 or any other suitable component.

Data is received from wireless field devices using multiple protocols at step 404. This could include, for example, the gateway 422 receiving process data and sensor attributes from the field instruments 112a-112e in ISA100 Wireless, WirelessHART, and/or other protocols. The differences between the protocols and the differences between the individual field devices create differences in the data received from the wireless devices, even when the wireless devices measure similar phenomena.

The received data is normalized at step 506. This could include, for example, the gateway 422 changing a bit width and a range of data values so that external clients can view the data in a unified format. As an example, two different temperature sensors may have different bit widths and data ranges in their native formats, which can be normalized and stored in a unified format so that external clients see similar types of data, even from the different temperature sensors.

The normalized data is stored in a cache or other memory at step 508. This could include, for example, the gateway 422 storing the data in the cache 423. In some embodiments, the data is normalized before being stored in the cache 423 so that the cache 423 only includes data in the normalized (and therefore unified) format.

The normalized data is sent to an external client or user at step 510. The external client or user may only see normalized data in the unified format, and the external client or user may be completely unaware of the exact protocol used to communicate with a specific field device. Additionally, since multiple external clients and users may connect to a wireless device manager 120, storing the data in the cache 423 after normalization in the unified format prevents the gateway 422 from having to convert the same data multiple times (although the gateway 422 could be designed to operate in this manner).

Although FIG. 5 illustrates one example of a method 500 for using a common interface to support multiple wireless communication protocols, various changes may be made to FIG. 5. For example, while shown as a series of steps, various steps in FIG. 5 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "receive" and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving data from multiple wireless field devices using multiple different wireless communication protocols;
normalizing the data from the wireless field devices using templates associated with the wireless field devices;
storing the normalized data in a unified format; and
transmitting the normalized data to a user device;
wherein each of the templates provides, for a specified type of wireless field device:
an indication of a type of data provided by the specified type of wireless field device;
a range of data provided by the specified type of wireless field device; and
how to normalize data from the specified type of wireless field device into the unified format.

2. The method of claim 1, wherein storing the normalized data comprises:
storing, in a cache, the normalized data in the unified format.

3. The method of claim 2, wherein transmitting the normalized data comprises:
retrieving the normalized data from the cache; and
transmitting the retrieved normalized data.

4. The method of claim 1, wherein the wireless communication protocols comprise an ISA100 Wireless protocol and a Wireless Highway Addressable Remote Transducer (WirelessHART) protocol.

5. The method of claim 1, further comprising:
generating the templates using device description (DD) files associated with the wireless field devices.

6. The method of claim 5, wherein generating the templates comprises:
using the DD files to map data fields associated with the wireless field devices to data fields of the unified format; and
using the DD files to determine formats of the data fields associated with the wireless field devices and to determine how to convert those formats into the unified format.

7. The method of claim 1, further comprising:
resetting a stale limit counter responsive to receiving data from one of the wireless field devices, the stale limit counter initialized based on the template associated with the wireless field device.

8. The method of claim 1, wherein the data from the multiple wireless field devices is received by a field router configured to communicate using all of the multiple different wireless communication protocols.

9. The method of claim 1, wherein transmitting the normalized data comprises transmitting the normalized data via a hypertext transfer protocol secure (HTTPS) interface, the user device having a user interface that uses HTTPS.

10. An apparatus comprising:
at least one interface configured to receive data from multiple wireless field devices using multiple different wireless communication protocols;
at least one processing device configured to normalize the data from the wireless field devices using templates associated with the wireless field devices and to store the normalized data in a unified format; and
an interface configured to transmit the normalized data to a user device;
wherein each of the templates provides, for a specified type of wireless field device:
an indication of a type of data provided by the specified type of wireless field device;
a range of data provided by the specified type of wireless field device; and
how to normalize data from the specified type of wireless field device into the unified format.

11. The apparatus of claim 10, further comprising at least one memory;
wherein the at least one processing device is further configured to store the normalized data in the unified format in the at least one memory.

12. The apparatus of claim 11, wherein the at least one processing device is configured to retrieve the normalized data from the at least one memory and to transmit the retrieved normalized data.

13. The apparatus of claim 10, wherein the wireless communication protocols comprise an ISA100 Wireless protocol and a Wireless Highway Addressable Remote Transducer (WirelessHART) protocol.

14. The apparatus of claim 10, wherein the at least one processing device is further configured to generate the templates using device description (DD) files associated with the wireless field devices.

15. The apparatus of claim 10, wherein the at least one processing device is further configured to reset a stale limit counter responsive to receiving data from one of the wireless field devices, the stale limit counter initialized based on the template associated with the wireless field device.

16. A non-transitory computer readable medium embodying a computer program, the computer program comprising computer readable program code for:
receiving data from multiple wireless field devices using multiple different wireless communication protocols;
normalizing the data from the wireless field devices using templates associated with the wireless field devices;
storing the normalized data in a unified format; and
initiating transmission of the normalized data to a user device;
wherein each of the templates provides, for a specified type of wireless field device:
an indication of a type of data provided by the specified type of wireless field device;
a range of data provided by the specified type of wireless field device; and
how to normalize data from the specified type of wireless field device into the unified format.

17. The computer readable medium of claim 16, wherein the computer program for storing the normalized data comprises computer readable program code for:
storing, in a cache, the normalized data in the unified format.

18. The computer readable medium of claim 17, wherein the computer readable program code for initiating transmission of the normalized data comprises computer readable program code for:
retrieving the normalized data from the cache; and
initiating transmission of the retrieved normalized data.

19. The computer readable medium of claim 16, wherein the wireless communication protocols comprise an ISA100 Wireless protocol and a Wireless Highway Addressable Remote Transducer (WirelessHART) protocol.

20. The computer readable medium of claim 16, wherein the computer program further comprises computer readable program code for:
generating the templates using device description (DD) files associated with the wireless field devices.

* * * * *